United States Patent [19]

Hachisuga

[11] Patent Number: 5,483,054
[45] Date of Patent: Jan. 9, 1996

[54] CONVERGING POSITION DETECTING APPARATUS WITH A SINGLE PHOTODETECTING ELEMENT

[75] Inventor: Masaki Hachisuga, Saitama, Japan

[73] Assignee: Fuji Xerox Co., Ltd., Tokyo, Japan

[21] Appl. No.: 220,505

[22] Filed: Mar. 31, 1994

[30] Foreign Application Priority Data

Apr. 1, 1993 [JP] Japan .................................. 5-096454

[51] Int. Cl.⁶ ............................................ H01J 40/14
[52] U.S. Cl. .................... 250/235; 250/201.4; 358/481; 359/216
[58] Field of Search .................... 358/481, 494; 250/235, 236, 201.4, 201.5, 201.6, 201.7, 201.8; 359/216, 217, 218, 219

[56] References Cited

U.S. PATENT DOCUMENTS 4,720,632  1/1988  Kaneko .................. 358/481
5,331,147  7/1994  Mizuno et al. .................... 250/235

FOREIGN PATENT DOCUMENTS 1-237614  9/1989  Japan .
4-155304  5/1992  Japan .

Primary Examiner—Edward P. Westin
Assistant Examiner—Jacqueline M. Steady
Attorney, Agent, or Firm—Finnegan, Henderson, Farabow, Garrett & Dunner

[57] ABSTRACT

A single photodetecting element, in front of which a knife edge is placed, is disposed in front of a scanning surface and outside a laser beam scanning region for the scanning surface. Two mirrors or a single half mirror is disposed outside the scanning region on the side opposite to the side where the photodetecting means is disposed, and directs the light beam to the photodetecting element along two optical paths. The photodetecting element and the two mirrors or single half mirror is so disposed that lengths of the two optical paths are equal to respective lengths of two imaginary optical paths to predetermined positions spaced from the scanning surface perpendicularly in opposite directions.

7 Claims, 4 Drawing Sheets

CONVERGING POSITION DETECTING APPARATUS WITH A SINGLE PHOTODETECTING ELEMENT

BACKGROUND OF THE INVENTION

The present invention relates to a converging position detecting apparatus, in particular, of a type which detects a deviation of a converging position on a scanning surface of a light beam that is emitted from a light source and scans the scanning surface in a converged state.

In conventional scanning optical apparatuses, a laser beam modulated in accordance with an image signal is deflected by a deflector to scan a scanning surface (e.g., the surface of a photoreceptor body) while being converged into a spot image by a converging lens system, to thereby effect recording. These apparatuses are commonly used in, for instance, laser printers. In these apparatuses, the laser beam converging state on the photoreceptor body is detected by a photoelectric conversion element disposed at an end of a scanning line.

In the above scanning optical apparatuses, environmental changes such as a temperature change may cause such problems as thermal deformation in individual parts of the lens system, light source device, etc., to deviate the converging position of the laser beam perpendicularly to the scanning surface. As a result, the beam diameter is increased to lower the image quality.

For example, Japanese Patent Application Unexamined Publication Nos. Hei. 1-237614 and Hei. 4-155304 disclose techniques to solve the above problem.

The publication 1-237614 discloses a technique shown in FIG. 7. A laser beam $L_1$ emitted from a laser light source unit 1 is converted to a parallel laser beam $L_2$ by a collimating lens 2. The laser beam $L_2$ is deflected by a rotary polygon mirror 3 and then converged by an fθ lens 5 to become a laser beam $L_3$. The laser beam $L_3$ impinges on two photodetecting means 11 and 12 that are spaced from a scanning surface perpendicularly in opposite directions. Each of the photodetecting means 11 and 12 consists of a photodetecting element and a slit which is narrower than a beam diameter. The converging position of the laser beam $L_3$ is detected based on the beam diameters as detected by the photodetecting means 11 and 12, and corrected so as to be located on the scanning surface.

The publication 4-155304 discloses an apparatus having a pair of opposed knife edges that are arranged in a scanning direction of a laser beam with a gap wider than a beam diameter and spaced from the scanning surface in opposite directions. The apparatus further has a photodetecting element that is disposed in rear of the pair of knife edges and is wider than their gap, and a detecting circuit for detecting a deviation of a converging position of the laser beam based on factors including signal waveforms corresponding to the respective knife edges.

However, the above conventional techniques have the following problems.

In the scanning optical apparatus shown in FIG. 7, the converging apparatus is equipped with the two photodetecting means 11 and 12 each consisting of the photodetecting element and the slit narrower than the beam diameter, and is therefore costly. Further, differences in characteristics between the two photodetecting means 11 and 12 need to be corrected.

In the second conventional apparatus, a beam of a single scan is detected with the pair of knife edges and the one photodetecting element. Since the converging position is detected based on a rise and a fall of a beam, it is difficult to obtain accurate detection results because of a difference between rise and fall characteristics of the photodetecting element and their variations.

SUMMARY OF THE INVENTION

An object of the present invention is to provide a converging position detecting apparatus which is simple in constitution and low in cost, and which can detect a deviation of a converging position of the laser beam without being affected by differences in characteristics between photodetecting means or in a single photodetecting means.

According to the invention, a converging position detecting apparatus in a scanning optical apparatus which scans a scanning surface by a light beam emitted from a light source and converged onto the scanning surface in a regular state, comprises:

a single photodetecting means disposed in front of the scanning surface and outside a scanning region of the laser beam for the scanning surface, for detecting the light beam; and light deflecting means disposed outside the scanning region on a side opposite to a side where the photodetecting means is disposed, for directing the light beam to the photodetecting means along two optical paths;

wherein the photodetecting means and the light deflecting means are so disposed that lengths of the two optical paths are equal to respective lengths of two imaginary optical paths to predetermined positions spaced from the scanning surface perpendicularly in opposite directions.

According to another aspect of the invention, a converging position detecting apparatus in a scanning optical apparatus which scans a scanning surface by a light beam emitted from a light source and converged onto the scanning surface in a regular state, comprises:

a single photodetecting means disposed outside a scanning region of the laser beam for the scanning surface and spaced from the scanning surface perpendicularly in a front or rear direction, for detecting the light beam; and light deflecting means, disposed outside the scanning region on the same side as the photodetecting means, for directing the light beam to the photodetecting means along an optical path having a length that is equal to an imaginary optical path to a predetermined position spaced from the scanning surface perpendicularly in a direction different than the photodetecting means.

DESCRIPTION OF THE PREFERRED EMBODIMENTS

A first embodiment of the present invention will be described in detail with reference to FIG. 1 and FIGS. 2(a) and 2(b).

Figure 1:
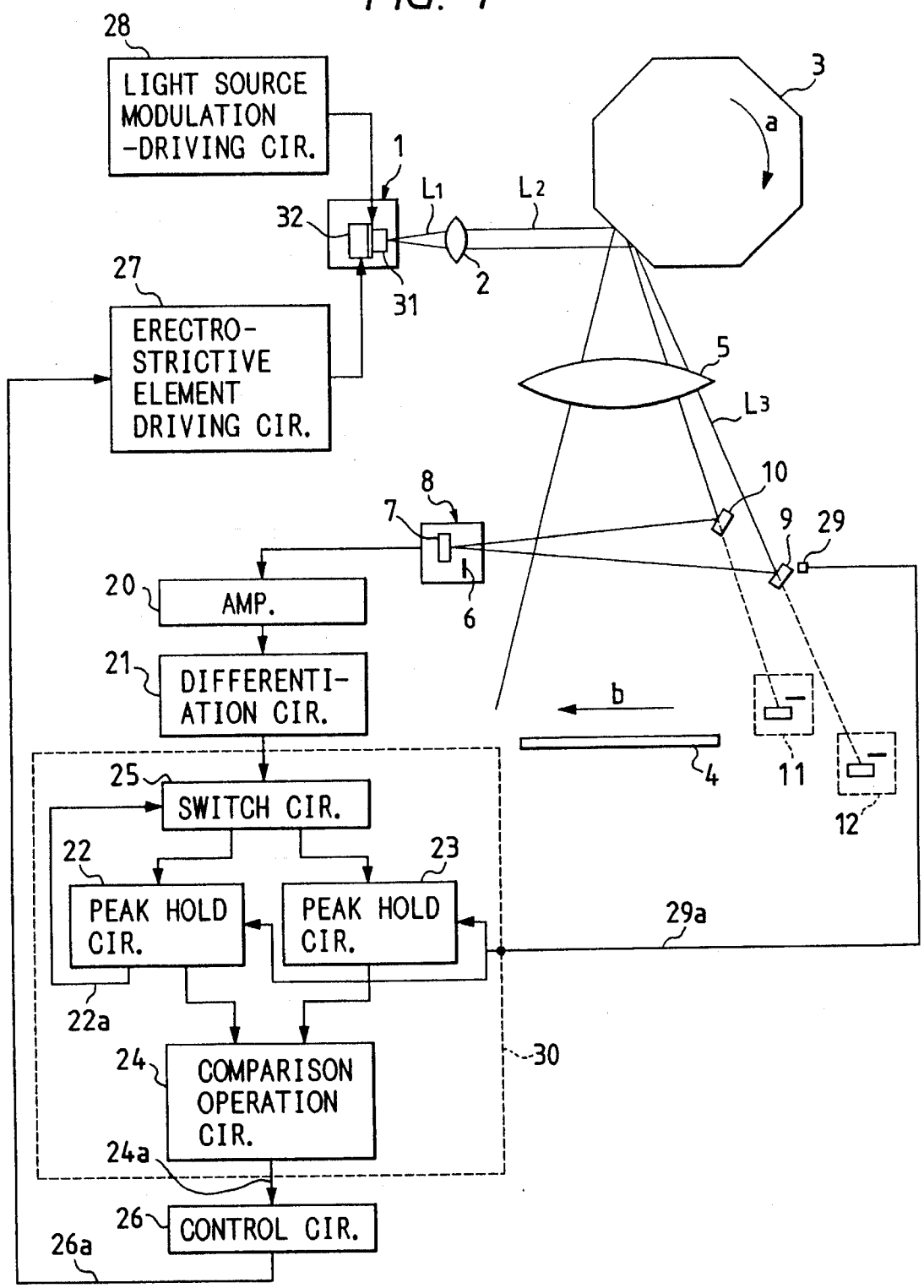
FIG. 1 schematically shows a scanning optical apparatus having a converging position detecting apparatus according to a first embodiment of the present invention.

FIG. 1 schematically shows a scanning optical apparatus having a converging position detecting apparatus according to the first embodiment. FIGS. 2(a) and 2(b) show large and small beam spots, respectively, and corresponding waveforms of detection signals.

In FIG. 1, a laser light source unit 1 includes a laser light source 31 such as a laser diode and an electrostrictive element 32. A collimating lens 2 converts a laser beam emitted from the laser light source 31 to a parallel beam. Rotating in a direction indicated by an arrow a, a rotary polygon mirror 3 deflect the parallel beam to effect scanning. An fθ lens 5 is disposed downstream of the rotary polygon mirror 3, and converges the parallel beam onto a recording medium, i.e., a scanning surface.

A photodetecting means 8 consists of a knife edge 6 and a photodetecting element 7. Alternatively, it may consist of a slit and a CCD, or other components. Mirrors 9 and 10 (light deflecting means) deflect the laser beam $L_3$ toward the photodetecting means 8 that is disposed outside the region of a recording medium 4 at a position equivalent to positions of imaginary photodetecting means 11 and 12 indicated by dashed lines.

An amplifier 20 amplifies a waveform signal output from the photodetecting element 7, and a differentiation circuit 21 differentiates a waveform signal as amplified by the amplifier 20. Peak hold circuits 22 and 23 hold peak voltages of waveform signals as obtained by differentiation by the differentiation circuit 21. The peak voltages are reset in response to a detection signal 29a sent from a scan start point sensor 29 (described later). A comparison operation circuit 24 compares absolute values of the peak voltages being held by the peak hold circuits 22 and 23, and produces a comparison signal 24a.

When the peak hold circuit 22 is reset in response to the detection signal 29a, a switch circuit 25 returns to the side of the peak hold circuit 22 (normal side). The switch circuit 25 is switched to the side of the peak hold circuit 23 upon reception of a peak hold signal 22a from the peak hold circuit 22.

A control circuit 26 supplies an electrostrictive element driving circuit 27 with a control signal 26a that is generated in accordance with the comparison signal 24a. The electrostrictive element driving circuit 27 deforms an electrostrictive element 32 in accordance with the control signal 26a. A light source modulation-driving circuit 28 modulation-drives the laser light source 31. The scan start point sensor 29 is disposed outside the scanning region of the laser beam $L_3$ and outside the mirrors 9 and 10, and detects a scan start point of the laser beam $L_3$.

Next, the operation of this embodiment will be described. Being modulation-driven by the light source modulation-driving circuit 28, the laser light source unit 1 emits the modulated laser beam $L_1$. The collimating lens 2 converts the laser beam $L_1$ to the parallel laser beam $L_2$. The laser beam $L_2$ is deflected by the rotary polygon mirror 3, and then converged by the fθ lens 5 to become the laser beam $L_3$. As the rotary polygon mirror 3 rotates in the direction indicated by the arrow a, the laser beam $L_3$ first impinges on the scan start point sensor 29, reaches the mirrors 9 and 10, and then scans the scanning surface in a direction indicated by an arrow b while forming a spot thereon.

In the above operation, the laser beam $L_3$ is reflected by the mirror 9 to impinge on the photodetecting element 7, and then reflected by the mirror 10 to impinge on the same photodetecting element 7.

When receiving the detection signal 29a from the scan start point sensor 29, the switch circuit 25 is switched to the normal side, i.e., the side of the peak hold circuit 22.

The signal indicating the beam diameter as detected by the photodetecting element 7 is amplified by the amplifier 20, and then differentiated by the differentiation circuit 21.

Figure 2A:
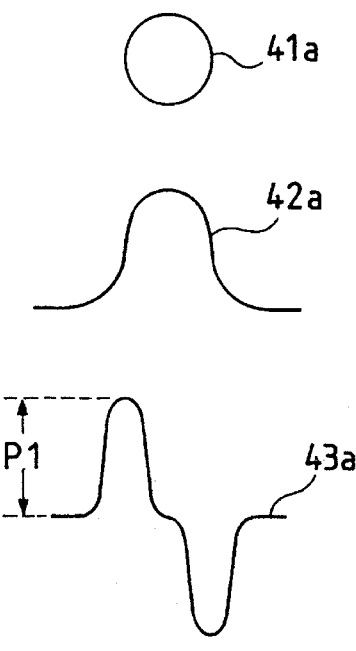
FIGS. 2(a) and 2(b) show beam diameters and corresponding waveforms of detection signals in the apparatus of FIG. 1.
Figure 2B:
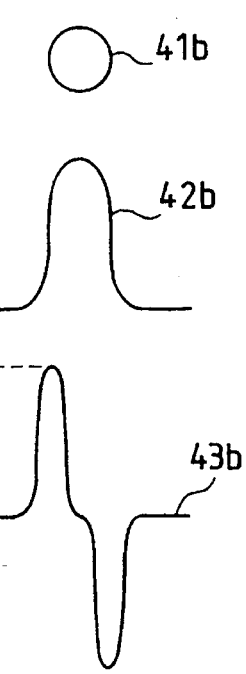

FIGS. 2(a) and 2(b) show waveform examples of the signal indicating the beam diameter as detected by the photodetecting element 7, and corresponding differentiated waveforms. FIG. 2(a) shows waveforms when the beam diameter is large, and FIG. 2(b) shows waveforms when it is small.

As is apparent from FIG. 2(a), a signal waveform 42a rises gently when a beam spot 41a is large, so that a peak value P1 of a differentiated waveform 43a is not large. On the other hand, as shown in FIG. 2(b), a signal waveform 42b rises steeply when a beam spot 41b is small, so that a peak value P2 of a differentiated waveform 43b is large.

Again with reference to FIG. 1, a first waveform signal indicating the beam diameter as differentiated by the differentiation circuit 21 is input to the peak hold circuit 22 via the switch circuit 25, where its peak value is held. Upon holding the peak value, the peak hold circuit 22 outputs the peak hold signal 22a, in response to which the switch circuit 25 is switched to the side of the peak hold circuit 23.

Subsequently, a second waveform signal indicating the beam diameter as differentiated by the differentiation circuit 21 is input to the peak hold circuit 23 via the switch circuit 25, where its peak value is held.

In the next scan, when receiving the laser beam $L_3$, the scan start point sensor 29 outputs the detection signal 29a. In response, the peak hold circuits 22 and 23 are reset.

Comparing the above two peak voltages, the comparison operation circuit 24 supplies the comparison signal 24a to the control circuit 26. For example, if the peak voltage being held by the peak hold circuit 22 is higher than that being held by the peak hold circuit 23, the comparison operation circuit 24 outputs a H-level comparison signal 24a. Conversely, if the former is smaller than the latter, the comparison operation circuit 24 outputs a L-level comparison signal 24a.

The control circuit 26 supplies the electrostrictive element driving circuit 27 with the control signal 26a that is generated in accordance with the comparison signal 24a. The electrostrictive element driving circuit 27 deforms the electrostrictive element 32 in accordance with the control signal 26a. The laser light source 31 is moved forward or backward by the deformation of the electrostrictive element 32 until the beam diameters as detected by the photodetecting means 8 from the laser beams $L_3$ reflected by the mirrors 9 and 10 become identical. As a result, correction is so made that the laser beam $L_3$ is converged onto the scanning surface.

Figure 3:
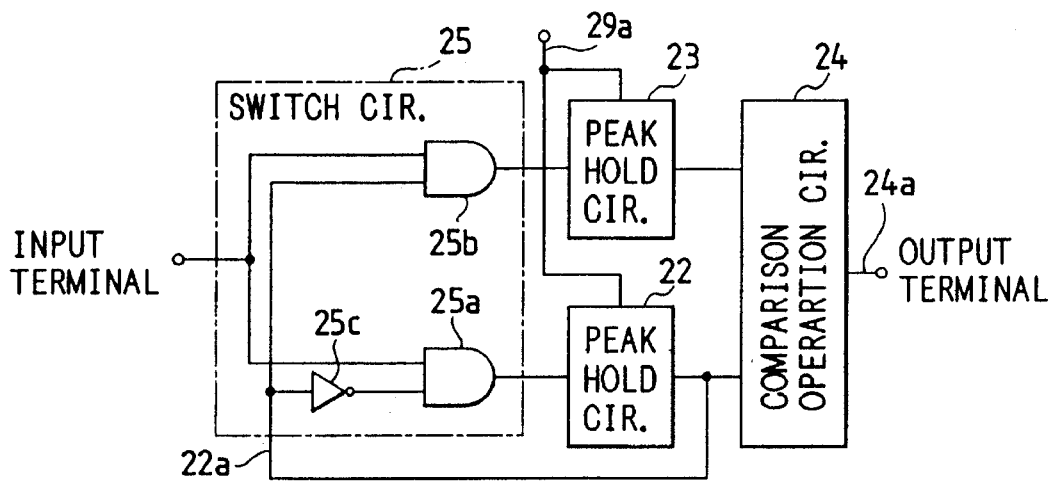
FIG. 3 is a circuit diagram showing part of a circuit used in the apparatus of FIG. 1.

FIG. 3 is a circuit diagram showing a specific example of a portion 30 of FIG. 1 enclosed by a dashed line. The parts in FIG. 3 that are the same as or equivalent to those in FIG. 1 are given the same reference symbols.

As shown in FIG. 3, the switch circuit 25 consists of AND gates 25a and 25b and an inverter 25c. The AND gate 25a is opened when the peak hold signal 22a is at the L level, and the AND gate 25b is opened when the peak hold signal 22a is at the H-level. As a result, the signal as input to the input terminal is introduced to the peak hold circuit 22 immediately after the peak hold circuit 22 is reset by the detection signal 29a. After the peak value is held by the peak hold circuit 22, the signal is introduced to the peak hold circuit 23.

As is apparent from the above description, according to this embodiment, in which the laser beam for scanning the recording medium 4 is introduced to the single photodetecting means 8 via the mirror 9 or 10, there is no need of correcting differences in characteristics between a plurality of photodetecting elements, unlike the conventional case. Further, this embodiment can provide the converging position detecting apparatus that is simple in constitution and low in cost.

Further, in this embodiment, since the photodetecting element 7 detects only one of a rise and a fall of a beam, variations as would otherwise be caused by differences between rise and fall characteristics of the photodetecting element 7 do not appear in the detection result. Thus, highly accurate detection results can be obtained.

A second embodiment of the invention will be described in detail with reference to FIGS. 4 and 5.

Figure 4:
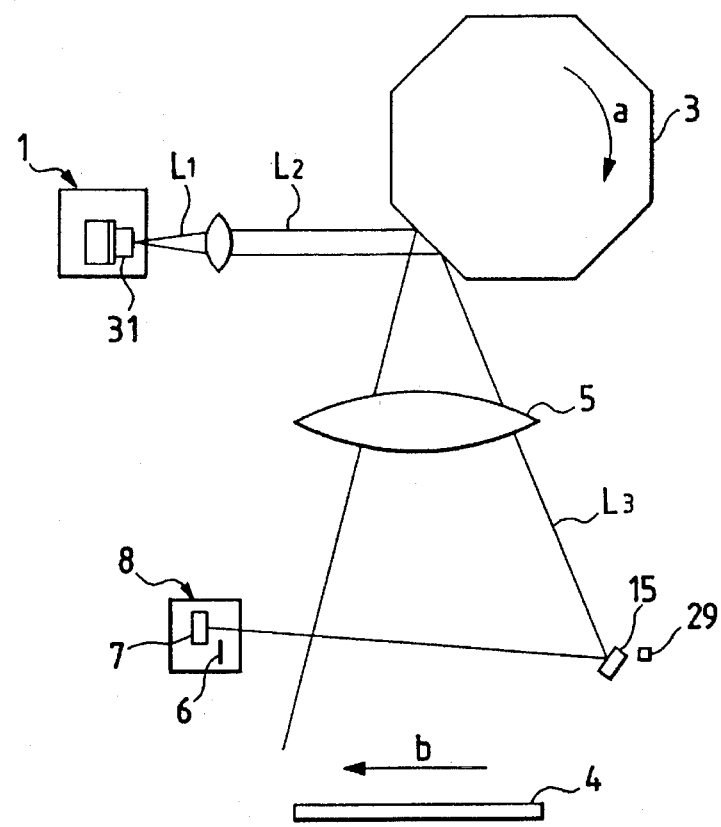
FIG. 4 schematically shows a scanning optical apparatus according to a second embodiment of the invention.
Figure 5:
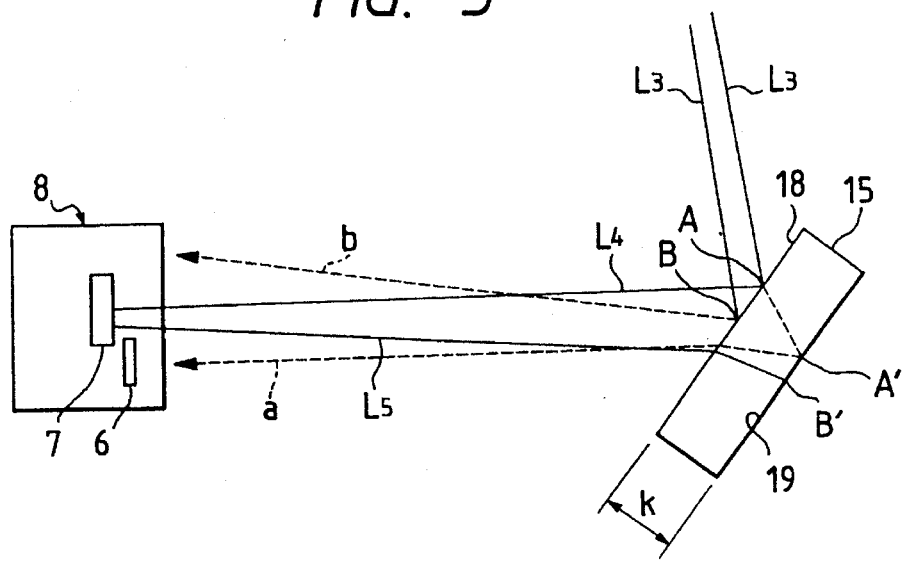
FIG. 5 shows a half mirror and portions in its vicinity in the apparatus of FIG. 4.
Figure 7:
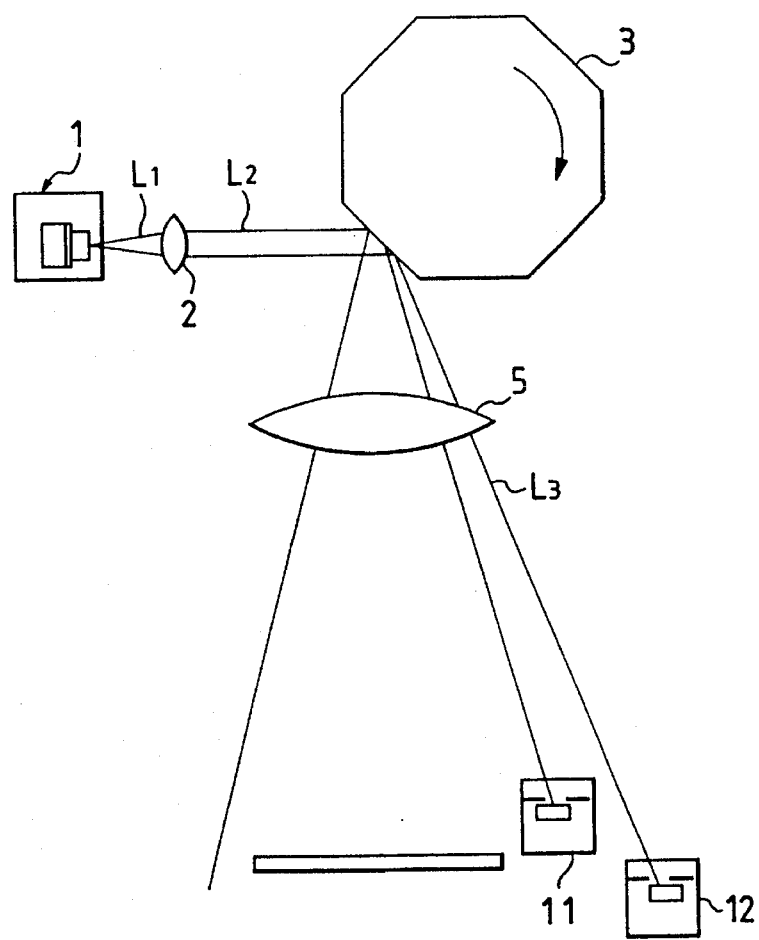
FIG. 7 shows a conventional scanning optical apparatus.

FIG. 4 schematically shows a scanning optical apparatus according to the second embodiment, and FIG. 5 is an enlarged diagram showing a part of FIG. 4 including a half mirror and portion in its vicinity. The parts in these figures that are the same as or equivalent to those in FIG. 1 are given the same reference symbols.

In FIGS. 4 and 5, a half mirror 15 of a thickness k has top reflecting surface 18 and a bottom reflecting surface 19. As is well known, the half mirror 15 reflects half of an input light beam while transmitting the other half.

When a laser beam $L_1$ is emitted from a laser light source 31, the respective devices operate to effect scanning by a laser beam $L_3$ in the same manner as in the first embodiment. The laser beam $L_3$ first reaches a scan start point sensor 29, and then the half mirror 15. After being reflected by the half mirror 15, the laser beam $L_3$ scans a recording medium 4, i.e., a scanning surface in a direction b while being converged.

When the laser beam $L_3$ impinges on the top reflecting surface 18 at a point A during its scanning operation, it is half reflected by the top reflecting surface 18. And the remaining half enters into the half mirror 15, is reflected by the bottom reflecting surface 19, and then travels along a path a indicated by a dashed line. As the scanning proceeds, the laser beam $L_3$ impinges on the top reflecting surface 18 at a point B. A part of the light beam $L_3$ reflected by the top reflecting surface 18 travels along a path b, and the other part reflected at a point B' of the bottom reflecting surface 19 reaches a photodetecting element 7.

Since the half mirror 15 has the thickness k as mentioned above, there exists a difference 2nk (n: refractive index of the half mirror 15) between an optical path length x of the beam reaching the photodetecting element 7 after being reflected by the top reflecting surface 18 and an optical path length y of the beam reaching the photodetecting element 7 after being reflected by the bottom reflecting surface 19.

Therefore, if the half mirror 15 and the photodetecting element 7 are arranged so that the recording medium 4 (scanning surface) is located at a position corresponding to the optical path length x plus nk, in other words, the optical path length y minus nk, information on a deviation of the converging position of the laser beam $L_3$ can be detected by the photodetecting element 7.

As described above, the second embodiment is provided with the half mirror 15 that has the function equivalent to that of the mirrors 9 and 10 of the first embodiment. Therefore, the second embodiment has, in addition to the advantages of the first embodiment, advantages that the number of parts can be reduced and time and labor of adjusting the parts setting positions and directions can be saved.

A third embodiment of the invention will be described in detail with reference to FIG. 6.

Figure 6:
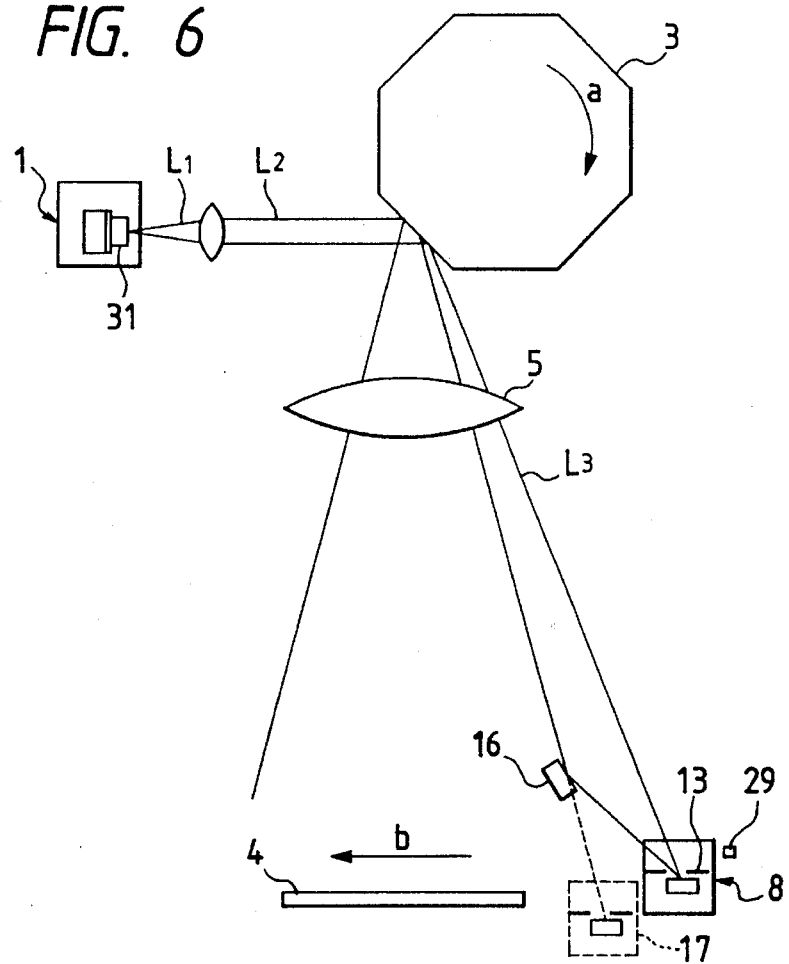
FIG. 6 schematically shows a scanning optical apparatus according to a third embodiment of the invention.

FIG. 6 schematically shows a scanning optical apparatus according to the third embodiment. The parts in FIG. 6 that are the same as or equivalent to those in FIG. 1 are given the same reference symbols.

In FIG. 6, a mirror 16 is disposed so that a photodetecting means 8 is located at a position equivalent to an imaginary photodetecting means 17 indicated by a dashed line.

When a laser beam $L_3$ is emitted from a laser light source 31, the respective devices operate to effect scanning by a laser beam $L_3$ in the same manner as in the first and second embodiments. The laser beam $L_3$ first reaches a scan start point sensor 29, and then reaches the photodetecting means 8, where a beam diameter is detected at a rise of a detection signal. Thereafter, the laser beam L3 is reflected by the mirror 16 and reaches the photodetecting means 8. In this case, although the laser beam $L_3$ scan the photodetecting means 8 in the reverse direction, the beam diameter can be detected at a rise of the detection signal in the same manner by virtue of the use of a slit 13. Then, the laser beam $L_3$ is converged onto the recording medium 4, i.e., the scanning surface.

As described above, in the third embodiment, since the beam diameter of the laser beam $L_3$ is detected by means of the one mirror 16 and the one photodetecting means 8, the number of parts can be reduced and the configuration can be made simple. Further, since two beam diameters are detected based on only rises of the detection signal, the deviation of the converging position of the laser beam can be detected without being affected by characteristics of the photodetecting element, which means an improvement in the measurement accuracy.

The apparatus of the third embodiment can be obtained simply by removing one of the two photodetecting means of the conventional apparatus and adding one light deflecting means (mirror 16). That is, the apparatus of the third embodiment can be easily obtained by modifying the conventional apparatus, i.e., by reusing it.

What is claimed is:

1. A converging position detecting apparatus in a scanning optical apparatus which scans a scanning surface by a light beam emitted from a light source and converged onto the scanning surface, comprising:

photodetecting means having only a single photodetecting element located outside a scanning region of the laser beam for the scanning surface, for detecting the light beam; and light deflecting means located outside the scanning region, for directing the light beam to the photodetecting means along two optical paths;

the photodetecting means and the light deflecting means being so arranged that lengths of the two optical paths are equal to respective lengths of two imaginary optical paths to predetermined positions spaced from the scanning surface in opposite directions perpendicular to the scanning surface, whereby the output of the photodetecting means controls the converging position of the scanning beam.

2. The converging position detecting means of claim 1, wherein the light deflecting means comprises two mirrors for reflecting the light beam toward the photodetecting means along the two optical paths, respectively.

3. The converging position detecting means of claim 1, wherein the light deflecting means comprises a half mirror having top and bottom reflecting surfaces, and the two optical paths are paths of beams reflected by the top and bottom reflecting surfaces, respectively.

4. The converging position detecting means of claim 1, wherein the photodetecting means comprises a knife edge disposed in front of the photodetecting element.

5. A converging position detecting apparatus in a scanning optical apparatus which scans a scanning surface by a light beam emitted from a light source and converged onto the scanning surface, comprising:

photodetecting means having only a single photodetecting element for detecting the light beam, the photodetecting means being located outside a scanning region of the laser beam for the scanning surface and spaced from the scanning surface in a front or rear direction perpendicular to the scanning surface; and light deflecting means, disposed outside the scanning region on the same side as the photodetecting means, for directing the light beam to the photodetecting means along an optical path having a length that is equal to an imaginary optical path to a predetermined position spaced from the scanning surface in a direction perpendicular to the scanning surface and opposite from the direction in which the photodetecting means is spaced, whereby the output of the photodetecting means controls the converging position of the scanning beam.

6. The converging position detecting apparatus of claim 5, wherein the photodetecting means comprises a a slit disposed in front of the photodetecting element.

7. The converging position detecting apparatus of claim 1 or 5, further comprising means for correcting a converging position of the light beam by moving the light source in its light emitting direction based on a detection signal produced by the photodetecting means so that the converging position is substantially located on the scanning surface.

* * * * *

UNITED STATES PATENT AND TRADEMARK OFFICE
CERTIFICATE OF CORRECTION

PATENT NO. : 5,483,054
DATED : January 09, 1996
INVENTOR(S) : Masaki HACHISUGA

It is certified that error appears in the above-indentified patent and that said Letters Patent is hereby corrected as shown below:

IN CLAIM 6, COLUMN 8, LINE 17, AFTER "comprises", DELETE THE SECOND "a".

Signed and Sealed this

Twenty-second Day of October, 1996

Attest:

BRUCE LEHMAN

*Attesting Officer*       *Commissioner of Patents and Trademarks*